(12) United States Patent
Yanohara

(10) Patent No.: US 7,997,385 B2
(45) Date of Patent: Aug. 16, 2011

(54) MACHINE TOOL

(75) Inventor: Naomitsu Yanohara, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 104 days.

(21) Appl. No.: 11/867,057

(22) Filed: Oct. 4, 2007

(65) Prior Publication Data

US 2008/0083585 A1    Apr. 10, 2008

(30) Foreign Application Priority Data

Oct. 5, 2006   (JP) .................................. 2006-274427

(51) Int. Cl.
   *F01M 9/00*   (2006.01)
(52) U.S. Cl. ...... 184/6.1; 184/6.14; 184/6.18; 184/6.22; 184/6.26; 184/6.3; 184/7.4; 184/104.1; 409/56; 409/135; 409/136; 409/231; 415/111; 415/112; 384/466; 384/474; 384/476; 73/114.55; 73/114.56
(58) Field of Classification Search .................. 184/6.1, 184/6.23, 6.4; 384/313, 473–475; 702/55, 702/189; 408/239 A, 239 R; 409/135–136, 409/231

See application file for complete search history.

(56) References Cited

U.S. PATENT DOCUMENTS

| | | | | |
|---|---|---|---|---|
| 4,514,123 A | * | 4/1985 | Johnstone et al. | 409/231 |
| 4,890,695 A | * | 1/1990 | Morris et al. | 184/6.3 |
| 5,526,783 A | * | 6/1996 | Ito et al. | 123/196 S |
| 2004/0098233 A1 | * | 5/2004 | Renner | 702/189 |

FOREIGN PATENT DOCUMENTS

JP       2006-007329 A1    1/2006
WO    WO 2005092565 A1 *  10/2005

* cited by examiner

*Primary Examiner* — Robert Siconolfi
*Assistant Examiner* — San Aung
(74) *Attorney, Agent, or Firm* — Burr & Brown

(57) ABSTRACT

The present invention is to provide a machine tool in which appropriate warm-up operation can be performed. Unnecessary warm-up operation before machining is not carried out and damage of bearings caused by the warm-up operation is prevented. A controlling unit stores data of a supply amount of lubricant to bearings and a rotation speed of a main spindle in a memory unit as time-series data. When rotation of the main spindle is started, the time-series data stored in the memory unit is used to calculate an amount of remaining lubricant in the bearings and determination of necessity of warm-up operation is made based upon the stored data. A rotation speed at a start-up time of the main spindle is controlled according to the determination result.

5 Claims, 3 Drawing Sheets (a) start-up after low speed rotation (b) start-up after high speed rotation

MACHINE TOOL

BACKGROUND OF THE INVENTION

This application claims the benefit of Japanese Patent Application Number 2006-274427 filed on Oct. 5, 2006, the entirety of which is incorporated by reference.

FIELD OF THE INVENTION

The present invention relates to a machine tool in which a main spindle is rotatably provided.

DESCRIPTION OF THE RELATED ART

A conventional machine tool (for example, a machine tool described in Patent Document 1) in which a main spindle is rotatably supported by bearings or the like is known. In such a machine tool, it is necessary to perform a start-up operation (hereinafter, called "warm-up operation") where the main spindle is rotated at a certain rotation speed for a fixed time period in order to stabilize a lubricant condition in the bearings or adjust heat balance of the main spindle, when the main spindle is started.
[Paten Literature 1] JP-A-2006-7329

BRIEF SUMMARY OF THE INVENTION

Conventionally, however, regardless of an amount of remaining lubricant in the bearings of the main spindle or temperature of bearing, a warm-up operation such as rotating the main spindle at a predetermined rotation speed for a predetermined time period under any circumstance was carried out. That is, only one pattern of a rotating operation of the main spindle as warm-up operation was set. Therefore, the warm-up operation was made for unnecessarily long time before machining, which may cause damage of the bearing.

The present invention is to solve the above-described problem, and an object of the present invention is to provide a machine tool in which appropriate warm-up operation can be performed (or warm-up operation is not performed if it not necessary) according to a condition of a main spindle, a warm-up operation time period before machining. Therefore, unnecessary warm-up operation time is not wasted and damage of the bearing caused by the warm-up operation can be prevented.

In order to achieve the above mentioned object, an invention described in claim 1 is a machine tool supporting a main spindle rotatably via a bearing, being capable of supplying lubricant to the bearing, and including a controlling unit which controls rotation operation of the main spindle and supply operation of lubricant to the bearing, wherein the controlling unit stores data of an amount of lubricant to be supply to the bearing and a rotation speed of the main spindle in a storing unit as time-series data, and when the main spindle is started to rotate, the time-series data stored in the storing means is used to calculate an amount of remaining lubricant in the bearings, and then determination of necessity of warm-up operation is made based upon the amount of remaining lubricant, and a rotation speed at a start-up time of the main spindle is controlled according to the determination result.

An invention in claim 2 is the machine tool described in claim 1, wherein the controlling unit stores at least one of data among a bearing temperature, a body temperature which is a temperature of a main spindle body, and an ambient temperature where the main spindle is placed as time-series data, as well as data of an amount of lubricant to supply and a rotation speed of the main spindle. The stored data is used for calculating an amount of remaining lubricant.

An invention described in claim 3 is the machine tool described in claim 1 or 2, wherein the controlling unit controls an amount of lubricant to supply to the bearing at a start-up time of the main spindle, based upon the calculated an amount of remaining lubricant.

It should be noted that "a main spindle is started" in the present invention means "a main spindle is started to rotate at a different rotation speed, when a rotation speed of the main spindle is changed during machining,", as well as "a main spindle is started associating with starting machining."

According to the present invention, the controlling unit stores data of an amount of lubricant to supply to the bearing and a rotation speed of the main spindle in the storing unit as time-series data, and when the main spindle is started, the time-series data stored in the storing unit is used to calculate an amount of remaining lubricant in the bearings. Then determination of necessity of warm-up operation is performed based upon the amount of remaining lubricant, and a rotation speed at a start-up time of the main spindle is controlled according to the determination result. In other words, when it is determined that a warm-up operation is not necessary based upon the calculated an amount of lubricant, the main spindle starts rotating at a rotation speed for regular machining. On the other hand, when it is determined that a warm-up operation is necessary, the main spindle starts rotating at a rotation speed for performing the warm-up operation. Therefore, appropriate determination of necessity of the warm-up operation can be made and thus deterioration of machining efficiency due to unnecessary warm-up operation before machining does not occur. Further, efficient machining can be achieved. Furthermore, since the rotation speed of the main spindle during a warming-up is controlled based upon the amount of remaining lubricant in the bearing, damage of the bearing caused by the warm-up operation can be prevented, which results in improvement of durability of the machine tool, machining accuracy, and the like.

According to the invention described in claim 2, the controlling unit stores at least one of data of a bearing temperature, a body temperature which is a temperature of a main spindle body, and an ambient temperature where the main spindle is placed as time-series data, as well as an amount of lubricant to supply and a rotation speed of the main spindle. The stored date is used for calculating an amount of remaining lubricant. That is, an amount of remaining lubricant is calculated based upon plural elements, so that control of a rotation speed of the main spindle can be more optimally performed based upon the amount of remaining lubricant. Therefore, further improvement of machining efficiency, durability of the machine tool, machining accuracy, and the like can be achieved.

In addition, according to the invention described in claim 3, the controlling unit controls an amount of lubricant to supply to the bearings at a start-up time of the main spindle based upon the calculated amount of remaining lubricant. Therefore, a condition of lubricant in the bearings at a start-up time of the main spindle can be better, and moreover, further improvement of machining efficiency, durability of the machine tool, machining accuracy, and the like can be achieved.

DETAILED DESCRIPTION OF THE INVENTION

A machine tool which is an embodiment of the present invention will be explained below with reference to the drawings.

Figure 1:
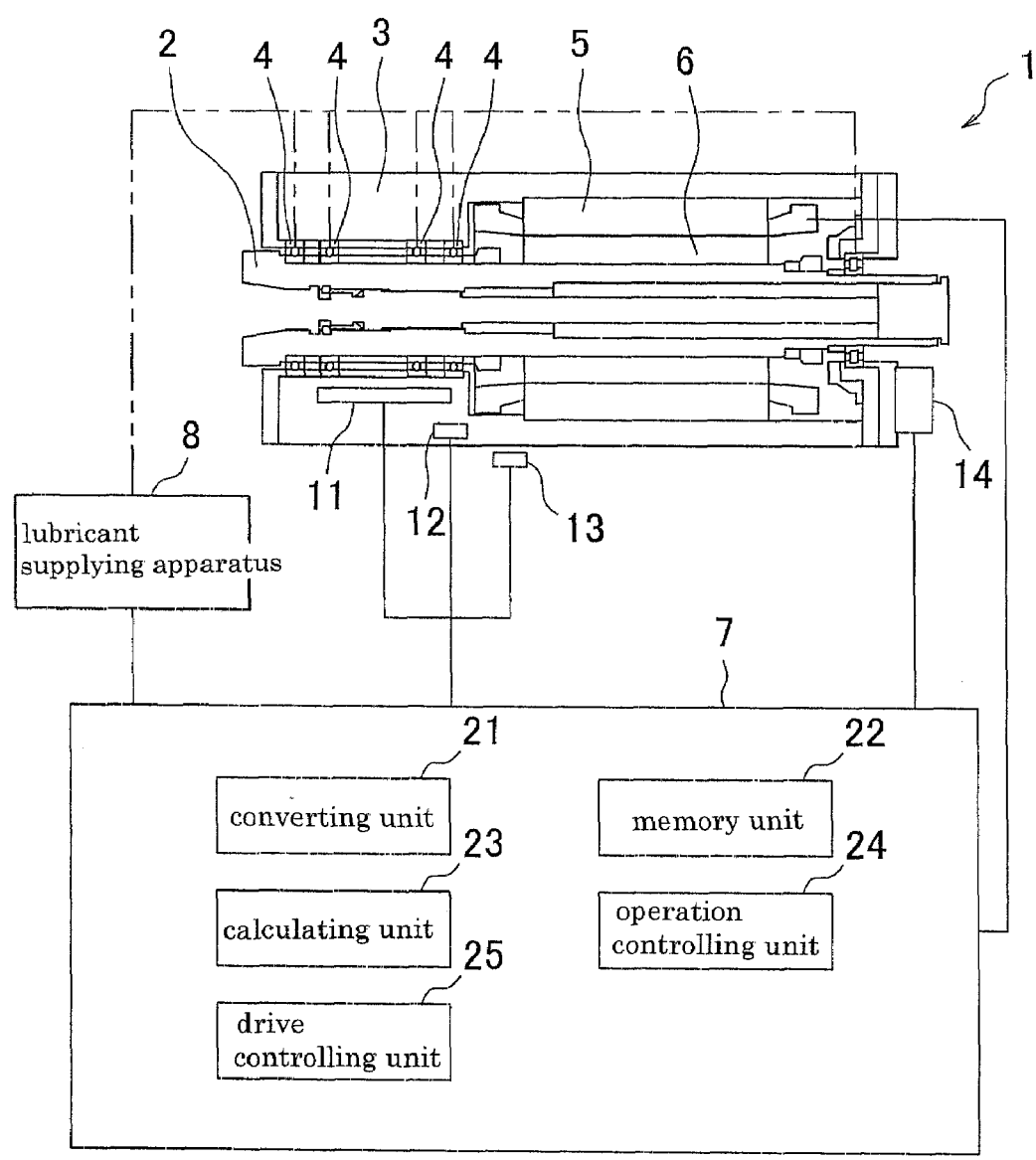
FIG. 1 is an explanatory view showing a control mechanism according to warm-up operation of a machine tool.

FIG. 1 is an explanatory view showing a control mechanism according to warm-up operation of a machine tool 1.

The machine tool 1 is provided with a main spindle 2 which is rotatably supported via a plurality of bearings 4, 4 . . . in a housing 3, and the main spindle 2 is rotationally driven by a driving unit comprising a stator 5 and a rotor 6. The machine tool 1 is provided with a controlling unit 7 which, for example, controls operation of the driving unit to control rotating operation of the main spindle 2. Further, appropriate amount of lubricant can be supplied to the plurality of bearings 4, 4 . . . which support the main spindle 2, while the lubricant amount to supply is controlled by a supplying apparatus 8. The lubricant supplying apparatus 8 is electrically connected to the controlling unit 7 to transmit a signal relating to an amount of supplied lubricant and a supply time period of lubricant to the controlling unit 7.

On the main spindle 2 of the machine tool 1 and/or near the main spindle 2, various temperature sensors such as a bearing temperature sensor 11 for measuring temperatures of the respective bearings 4, a machine body temperature sensor 12 for measuring a temperature of the housing 3, and an ambient temperature sensor 13 for measuring an ambient (where the main spindle 2 is placed) temperature as well as a rotation speed detecting sensor 14 which can detect a rotation speed of the main spindle 2 are placed. The respective sensors are electrically connected to the controlling unit 7 to transmit signals relating to the bearing temperature, the machine body temperature, the ambient temperature, and the rotation speed of the main spindle 2, respectively, to the controlling unit 7.

On the other hand, the controlling unit 7 has a converting unit 21 for digitalizing the amount of lubricant to supply, the supply time, the bearing temperature, the machine body temperature, the ambient temperature, and the rotation speed of the main spindle 2, and the like from the signals received from the respective sensors, a memory unit 22 for storing numerical values digitalized by the converting unit 21 as time-series data, a calculating unit 23 for calculating an amount of remaining lubricant in the bearings 4 at a starting time of the main spindle 2 using the time-series data, an operation controlling unit 24 for determining an amount of lubricant to be supplied to the bearings 4, a rotation speed of the main spindle 2, and a rotation time period of the main spindle 2 from the calculation result in the calculating unit 23, and a drive controlling unit 25 which operates a driving unit of the main spindle 2 (by transmitting a rotation command to the driving unit, and the like) associated with the rotation speed and the rotation time period determined in the operation controlling unit 24.

Here, a calculating method of an amount of remaining lubricant in the bearings 4 in the calculating unit 23 will be explained.

First, only a relationship between an amount of lubricant to supply to the bearings 4 (lubricant supply amount) and an amount of remaining lubricant in the bearings 4 will be considered. When lubricant is supplied to the bearings 4, not all lubricant remains in the bearings 4, and a certain percentage of the amount of lubricant which is determined according to a structure of the main spindle 2, a type of the bearings 4, and the like remains in the bearings 4. On the other hand, the rest of the lubricant is discharged outside from a drain or a space between a rotating portion and a fixed portion in the main spindle 2, and the like. When an amount of lubricant to be supplied per unit time is constant, an amount of remaining lubricant per unit time is also constant. Therefore, a current amount of remaining lubricant is a numerical value obtained by adding up previous amount of remaining lubricant. Next, considering a case in which the main spindle 2 rotates, an amount of remaining lubricant in the bearings 4 changes due to a centrifugal force caused by rotation of the main spindle 2, changes of airflow associated with changes of pressure, and the like, even if an amount of lubricant to be supplied is constant. However, a current amount of remaining lubricant can be obtained with consideration of rotation of the main spindle, by correcting the amount of remaining lubricant per unit time which is calculated from an amount of supplied lubricant per unit time using a coefficient derived from changes of a rotation speed per unit time and adding up them.

Further, a relationship between a temperature in each portion and an amount of remaining lubricant will be considered. Lubricant has a characteristic of changing its viscosity due to temperature change. Then, considering an influence of a temperature (bearing temperature) of the bearings 4, when the main spindle 2 rotates at a high speed, the temperature of the bearing 4 rises and the viscosity of lubricant in the bearing 4 lowers. When the viscosity of lubricant lowers, lubricant is made more likely to be discharged outside, so that the amount of remaining lubricant in the bearing 4 is decreased. On the other hand, when the main spindle 2 stops or rotates at low speed, the bearing temperature becomes close to the machine body temperature or the ambient temperature. When the machine body temperature or the ambient temperature is low, the viscosity of lubricant raises, so that the amount of remaining lubricant is increased. Further, influence of the machine body temperature and the ambient temperature will be considered. Since the lubricant is supplied by the lubricant supplying apparatus 8 attached on the machine tool to the bearings 4 via a pipe attached near the main spindle 2 and a path in a housing of the main spindle 2, the lubricant is influenced by the machine body temperature and the ambient temperature which are temperatures of the path and the pipe for supplying the lubricant to the bearings 4. In addition, the viscosity (influenced by the ambient temperature) also influences the amount of remaining lubricant before being supplied by the lubricant supplying apparatus 8. Therefore, by further correcting the above amount of remaining lubricant calculated from the amount of lubricant to be supplied and the rotation speed of the main spindle 2 based upon the bearing temperature, the machine body temperature, and the ambient temperature, it becomes possible to calculate more accurate amount of remaining lubricant.

Figure 2:
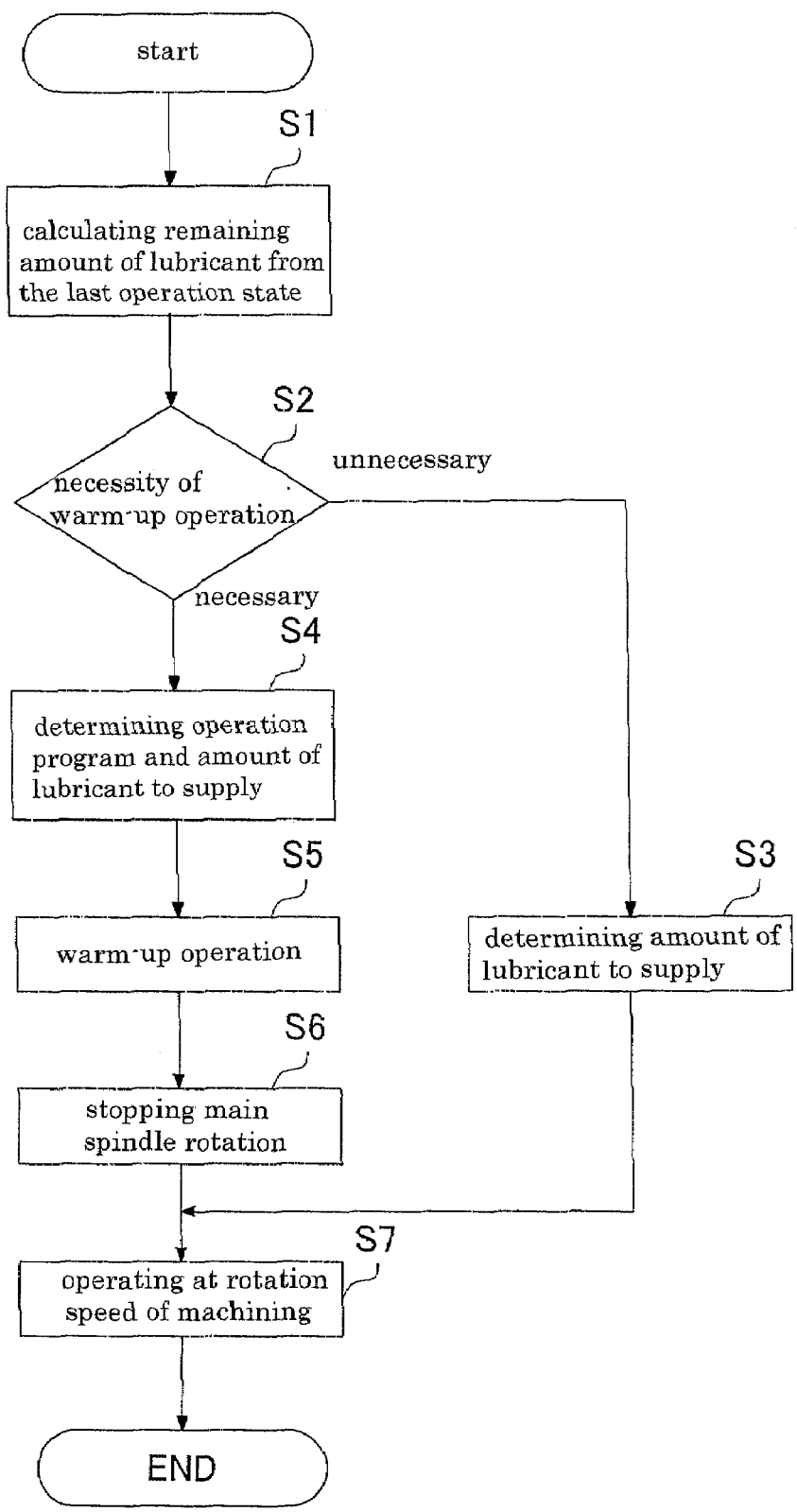
FIG. 2 is a flowchart showing control performed when a main spindle is started.

The warm-up operation of the main spindle 2 in the machine tool 1 as described above will be explained below with reference to FIG. 2. FIG. 2 is a flowchart showing control which is performed when the main spindle 2 is started.

When the main spindle 2 is started, the machine tool 1 calculates current (starting-up time) amount of remaining lubricant in the bearings 4, 4 . . . in the calculating unit 23, based upon time-series data (namely, an amount of lubricant to supply, a supply time period, bearing temperatures, a machine body temperature, an ambient temperature, and a rotation speed of the main spindle 2) of the last operation stored in the memory unit 22, and stores the calculated value in the memory unit 22 (S1). Next, the machine tool 1 detects a current bearing temperature of the bearings 4, a current machine body temperature, and a current ambient temperature by using the respective sensors 11, 12, and 13, respectively, and determines whether the detected bearing temperatures, the detected machine body temperature, the detected ambient temperature, the amount of remaining lubricant calculated at S1, and the elapsed time up to now from the time when the last amount of remaining lubricant is calculated satisfy respective predetermined thresholds (S2). Then, when it is determined that all the predetermined thresholds are satisfied as a result of the determination at S2, the machine tool 1 determines that such a warm-up operation as described hereinafter is not required, and determines an amount of lubricant to supply based upon the detected bearing temperatures, the detected machine body temperature, the detected ambient temperature, the amount of remaining lubricant calculated at S1 (S3). After supplying the lubricant to the bearings 4, the main spindle 2 is started at a regular rotation speed for machining (S7) to start machining.

On the other hand, if any of the thresholds is not satisfied as a result of the determination as S2, the machine tool 1 determines that the warm-up operation is required, and determines the most appropriate operation program of the warm-up operation for the main spindle 2 (namely, the rotation speed and the rotation time period of the main spindle 2 in which the bearings are not damaged and the time is the shortest) and an amount of lubricant to supply (S4) determined based upon the detected bearing temperature, the detected machine body temperature, the detected ambient temperature, the amount of remaining lubricant calculated at S1. Then, after the amount of lubricant determined at S4 is supplied to the bearings 4, and the warm-up operation of the main spindle 2 is performed based on the operation program determined at S4 (S5), the rotation of the main spindle 2 is temporarily stopped (S6). Then, the main spindle 2 is rotated at a regular rotation speed (S7) to start machining.

The machine tool 1 performs the warm-up operation of the main spindle 2 in the above manner.

Further, during rotation of the main spindle 2, the sensors 11,12,13,14 and the like detect, in time series, the bearing temperatures, the machine body temperature, the ambient temperature, the rotation speed of the main spindle 2, the amount of lubricant to supply, and the time period to supply as time series data respectively, and the detected data is stored in the memory unit 22. When machining is completed, a command of stopping rotation is issued to the driving unit of the main spindle 2, and storing operation of the time-series data is stopped.

Figure 3:
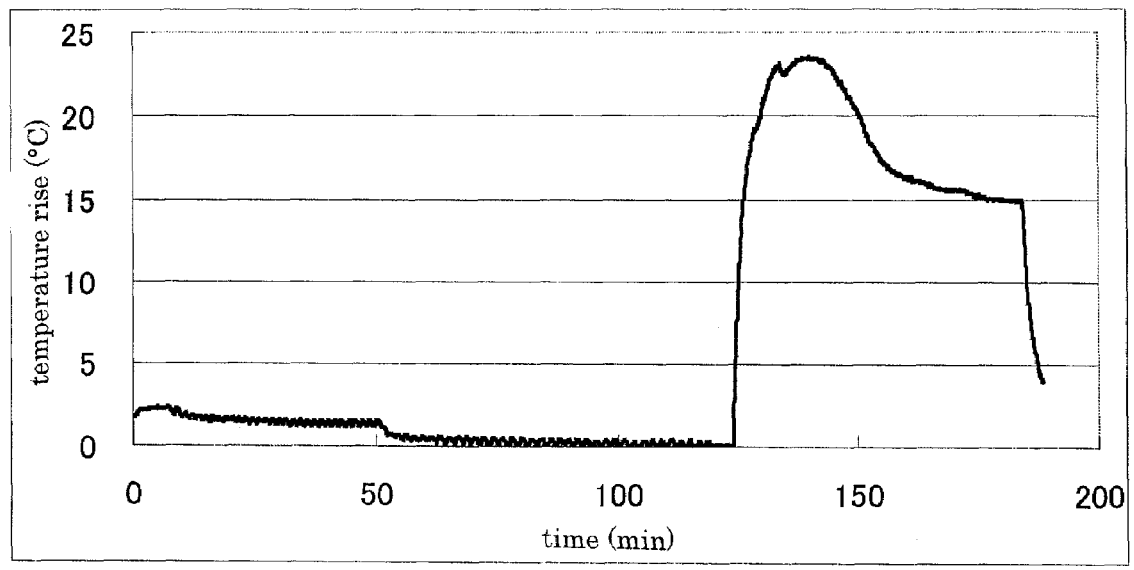
FIG. 3A is a diagram showing a relationship between an amount of rise in temperature of a machine body temperature and a time period at a time when the main spindle is started after low speed rotation.
FIG. 3B is a diagram showing a relationship between an amount of rise in temperature of a machine body temperature and a time period at a time when the main spindle is started after high speed rotation.
Figure 3:
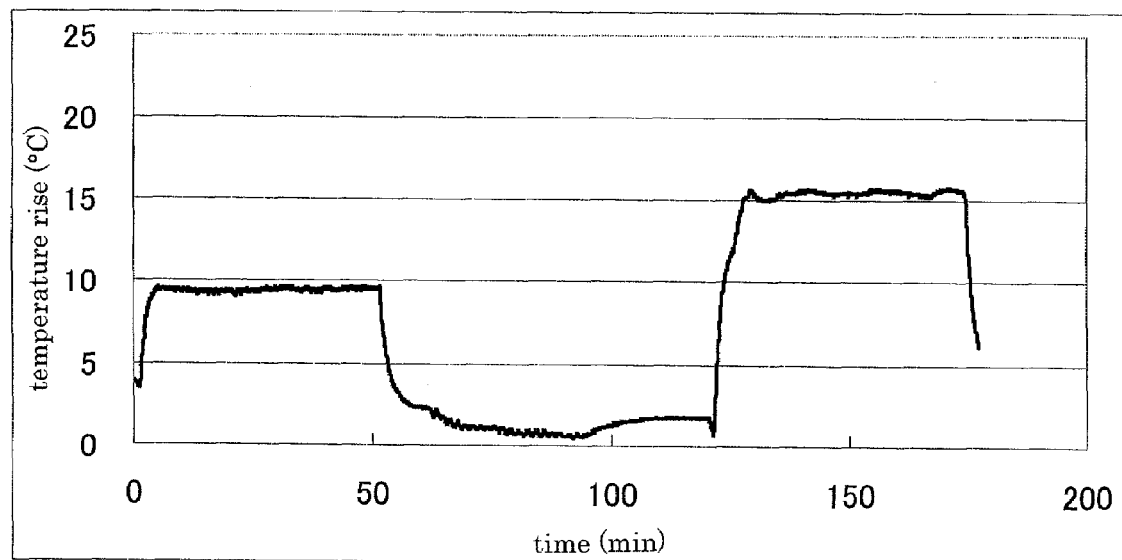

Here, with reference to FIGS. 3A and 3B, the determination of necessity of the warm-up operation will be explained. FIG. 3A is a diagram showing a relation between an amount of rise in temperature (unit is ° C.) of the machine body temperature and a time period (unit is min) at a time of starting the main spindle 2 after low speed rotation (in a state of being large in amount of remaining lubricant), and FIG. 3B is a drawing showing a relation between an amount of rise in temperature of the machine body temperature and a time period at a time of starting the main spindle 2 after high speed rotation (in a state of being small in amount of remaining lubricant).

As shown in FIG. 3A, since the amount of remaining lubricant is large in start-up after low speed rotation, it takes a long time to saturate the machine body temperature after start-up. Therefore, the warm-up operation is required to stabilize temperature balance of the main spindle before the main spindle is started and further providing a good lubricant state of the bearings is required. On the other hand, since the amount of remaining lubricant is appropriate in start-up after high speed rotation, the temperature balance of the main spindle is immediately stabilized after start-up as shown in FIG. 3B, so that it is not necessary to carry out the warm-up operation. As described above, the necessity of the warm-up operation depends on how the main spindle 2 was operated before start-up. Then, the machine tool 1 of the present embodiment accurately determines the necessity of such warm-up operation as described above based upon time-series data of the last operation stored in the memory unit 22.

According to the machine tool 1 having the above constitution, when rotation of the main spindle 2 is started, the amount of remaining lubricant is calculated based upon the time-series data in the last operation stored in the memory unit 22, and the necessity of the warm-up operation is determined by using the amount of remaining lubricant, the detected bearing temperatures, the detected machine body temperature, and the detected ambient temperature. Therefore, the determination of necessity of the warm-up operation can be appropriately made, and thus degradation of machining efficiency caused by unnecessary warm-up operation before machining is prevented. As a result, efficient machining can be performed.

When the warm-up operation is performed, the most appropriate operation program for the main spindle (especially, rotation speed and rotation time period of the main spindle) and the amount of lubricant to supply are determined based upon the calculated amount of remaining lubricant, the detected bearing temperatures, the machine body temperature, and the ambient temperature. Then, the warm-up operation is carried out based upon the determined operation program, and the determined amount of lubricant is supplied to the bearings. Since the operation program and the lubricant supply amount are determined based upon a plurality of elements, the most appropriate operation program and the amount of lubricant to supply can be reliably determined. Further, as the warm-up operation is carried out based upon the most appropriate operation program and the appropriate amount of lubricant is supplied, good condition on lubricant in the bearings can be realized. Further, as unnecessary warm-up operation is not carried out for long time or improperly, damage to the bearings never happens due to inappropriate warm-up operation. Therefore, machining efficiency and accuracy, and durability of the machine tool can be improved.

It should be noted that the constitution according to the machine tool of the present invention is not limited to aspects described in the embodiments. The controlling unit of the machine tool, the constitution relating to the determination of the necessity of the warm-up operation, the control relating to the start-up operation, or the like can be modified without departing from the scope of the invention.

For example, in the embodiment, the determination of the necessity of the warm-up operation is made based upon the bearing temperatures, the machine body temperature, the ambient temperature, the amount of remaining lubricant, and the operation program as warm-up operation is determined based upon the same. However, not all of them are required to be used as a determination element, either one of them may be used to make the determination of the necessity of the warm-up operation and the determination of operation program.

When an amount of remaining lubricant is calculated, it is not necessary to use all elements of the time-series data stored in the memory unit. It can be calculated based upon either one of the elements.

Further, in the above embodiment, although the determination of necessity of the warm-up operation is made at only a start-up time of the main spindle, when a regular rotation speed of the main spindle is changed during machining operation (for example, when a regular rotation speed is increased), the determination about necessity of warm-up operation as described above is made.

What is claimed is:

1. A machine tool comprising:
   a main spindle rotatably supported via a bearing into which lubricant is supplied; and
   a controlling unit which controls rotation operation of the main spindle and supply operation of lubricant to the bearing,
   wherein the controlling unit stores data of an amount of lubricant to supply to the bearing during operation and a rotation speed of the main spindle in a storing unit as time-series data, and when the main spindle is started, the time-series data of the previous operation stored in the storing means is used to calculate an amount of remaining lubricant in the bearing, to determine the necessity of a warm-up operation based upon the amount of remaining lubricant in the bearing at the time of starting, and if the amount of remaining lubricant exceeds a threshold value and the controlling unit determines that a warm-up operation is required, the controlling unit determines a rotation speed and a rotation time for the warm-up operation and performs the warm-up operation according to the predetermined rotation speed and rotation time.

2. The machine tool according to claim 1, wherein the controlling unit stores at least one of the data among a bearing temperature, a body temperature which is a temperature of a main spindle body, and an ambient temperature which is a temperature of an environment where the main spindle is placed as the time-series data, as well as a supply amount of lubricant and a rotation speed of the main spindle, in order to use the same for calculation of an amount of remaining lubricant.

3. The machine tool according to claim 1, wherein the controlling unit controls an amount of lubricant to supply to the bearing at a start-up time of the main spindle based upon the calculated amount of remaining lubricant.

4. The machine tool according to claim 2, wherein the controlling unit controls an amount of lubricant to supply to the bearing at a start-up time of the main spindle based upon the calculated amount of remaining lubricant.

5. The machine tool of claim 1, wherein when the determination result is to conduct a warm-up operation, the controlling unit selects a warm-up operation program comprising at least a rotation speed, rotation time period and amount of lubricant to be supplied to the bearing based on at least the amount of remaining lubricant calculated in the bearing.

* * * * *